(12) United States Patent
Huang et al.

(10) Patent No.: US 11,691,339 B2
(45) Date of Patent: Jul. 4, 2023

(54) PRODUCT FRAMING

(71) Applicant: Hewlett-Packard Development Company, L.P., Spring, TX (US)

(72) Inventors: Wei Huang, Palo Alto, CA (US); Steven J. Simske, Fort Collins, CO (US); Ingeborg Tastl, Palo Alto, CA (US); Melanie M. Gottwals, Palo Alto, CA (US); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 297 days.

(21) Appl. No.: 16/463,542

(22) PCT Filed: Feb. 15, 2017

(86) PCT No.: PCT/US2017/017943
§ 371 (c)(1),
(2) Date: May 23, 2019

(87) PCT Pub. No.: WO2018/151720
PCT Pub. Date: Aug. 23, 2018

(65) Prior Publication Data
US 2019/0351612 A1    Nov. 21, 2019

(51) Int. Cl.
*B29C 64/00*         (2017.01)
*B29C 64/171*        (2017.01)
(Continued)

(52) U.S. Cl.
CPC ...... *B29C 64/171* (2017.08); *B01D 67/00045* (2022.08); *B01D 67/00415* (2022.08); *B22F 10/00* (2021.01); *B22F 10/85* (2021.01); *B22F 12/00* (2021.01); *B22F 12/82* (2021.01); *B29C 64/00* (2017.08); *B29C 64/10* (2017.08); *B29C 64/176* (2017.08); *B29C 64/182* (2017.08);
(Continued)

(58) Field of Classification Search
CPC .............................. B29C 64/171; B33Y 10/00
See application file for complete search history.

(56) References Cited

U.S. PATENT DOCUMENTS

| 8,221,858 | B2 | 7/2012 | Mannella |
| 8,285,411 | B2 | 10/2012 | Hull et al. |

(Continued)

FOREIGN PATENT DOCUMENTS

| JP | 2015186851 A | 10/2015 |
| WO | WO-2012140658 A2 | 10/2012 |

(Continued)

OTHER PUBLICATIONS https://snakeclamp.com/blogs/news/snakeclamp-products-launches-new-line-of-action-figure-stands (Year: 2015).*

(Continued)

*Primary Examiner* — Nicholas R Krasnow
(74) *Attorney, Agent, or Firm* — Shook, Hardy & Bacon L.L.P.

(57) ABSTRACT

An example system includes an object and a support frame supporting the object. The support frame constrains movement of the object relative to the support frame, and the support frame includes at least one of a cage or a shackle to non-rigidly constrain movement of at least a part of the object.

17 Claims, 6 Drawing Sheets

(51) Int. Cl.
| | |
|---|---|
| B33Y 10/00 | (2015.01) |
| B33Y 30/00 | (2015.01) |
| B33Y 40/00 | (2020.01) |
| B33Y 40/20 | (2020.01) |
| B22F 12/00 | (2021.01) |
| B29C 64/245 | (2017.01) |
| B29C 64/255 | (2017.01) |
| B33Y 80/00 | (2015.01) |
| B33Y 40/10 | (2020.01) |
| B29C 64/182 | (2017.01) |
| B29C 64/30 | (2017.01) |
| B33Y 70/00 | (2020.01) |
| B29C 64/20 | (2017.01) |
| B29C 64/307 | (2017.01) |
| B29C 64/25 | (2017.01) |
| B22F 10/85 | (2021.01) |
| B33Y 50/02 | (2015.01) |
| B22F 10/00 | (2021.01) |
| B01D 67/00 | (2006.01) |
| B29C 64/205 | (2017.01) |
| B29C 64/176 | (2017.01) |
| B29C 64/10 | (2017.01) |
| B29C 64/40 | (2017.01) |
| B33Y 99/00 | (2015.01) |
| B29C 64/227 | (2017.01) |
| B29C 64/393 | (2017.01) |
| B33Y 50/00 | (2015.01) |
| B22F 12/82 | (2021.01) |
| B29C 64/386 | (2017.01) |

(52) U.S. Cl.
CPC ............ *B29C 64/20* (2017.08); *B29C 64/205* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/386* (2017.08); *B29C 64/393* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | | |
|---|---|---|---|
| 2009/0306950 A1* | 12/2009 | De Winter | G16C 20/30 703/11 |
| 2010/0060093 A1* | 3/2010 | Hunter | B60L 53/53 290/55 |
| 2010/0086721 A1* | 4/2010 | Batchelder | B29C 64/40 428/43 |
| 2011/0282392 A1* | 11/2011 | Murphy | A61F 2/4455 606/279 |
| 2012/0018926 A1* | 1/2012 | Mannella | B29C 64/165 264/500 |
| 2012/0067501 A1 | 3/2012 | Lyons | |
| 2013/0216174 A1* | 8/2013 | Braun | F16C 33/46 384/572 |
| 2014/0165381 A1 | 6/2014 | Rauschenbach et al. | |
| 2016/0263839 A1 | 9/2016 | Miedema | |
| 2016/0352201 A1* | 12/2016 | Ranjan | H02K 17/165 |
| 2017/0023061 A1* | 1/2017 | Sanz | B29C 64/112 |
| 2017/0130774 A1* | 5/2017 | Madge | F16C 33/56 |
| 2017/0191527 A1* | 7/2017 | Krebs | F16C 33/3887 |
| 2017/0259507 A1* | 9/2017 | Hocker | B29C 64/35 |
| 2018/0368992 A1* | 12/2018 | Zink | A61B 90/39 |
| 2020/0200223 A1* | 6/2020 | Bachmann | F16C 19/527 |

FOREIGN PATENT DOCUMENTS

| | | |
|---|---|---|
| WO | WO-2014178834 A1 | 11/2014 |
| WO | WO-2016146374 A1 | 9/2016 |

OTHER PUBLICATIONS

Strano, G. et al., a New Approach to the Design and Optimisation of Support Structures in Additive Manufacturing, Aug. 2, 2012, < http://link.springer.com/article/10.1007/s00170-012-4403-x >.

* cited by examiner

PRODUCT FRAMING

BACKGROUND

Three-dimensional (3D) printing is becoming prevalent in a variety of applications. For example, 3D printing may be used to manufacture, or print, products ranging from toys to pharmaceutical tablets. In 3D printing of such products, the products may be formed with a support structure and then be subjected to various forms of post-processing, such as sorting, cleaning and packaging.

BRIEF DESCRIPTION OF THE DRAWINGS

For a more complete understanding of various examples, reference is now made to the following description taken in connection with the accompanying drawings in which.

DETAILED DESCRIPTION

Figure 1:
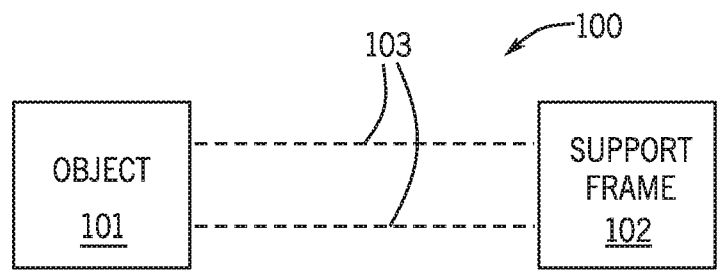
FIG. 1 is a schematic illustration of an example system.

Various examples provide framing of products that facilitates various post-processing activities. In this regard, various examples provide framing of an object such that the object is supported and movement of the object is limited relative to the frame. Such framing allows, for example, access to portions of the object for post-processing (e.g., cleaning) that may be difficult to access otherwise. Various examples of the framing described herein can provide protection of the object (e.g., cushioning) while allowing limited movement of the object.

In various examples, 3D-printed (3DP) production support frames for 3DP parts may facilitate automated unpacking, cleaning and conveyance operations, to provide components of final product packaging, and to provide quality control indicators.

In various examples, systems or devices can include geometrically packed 3DP parts and 3DP production support frames corresponding to the 3DP parts, where the frames loosely constrain the 3DP parts during post-processing operations.

In some examples, the 3DP production support frames may be self-supporting and may conform to a standardized geometry designed for automated batch processing. In some examples, the 3DP support frames may include a relatively flexible cushioning portion and a relatively rigid support portion to provide cushioning and support for the corresponding 3DP parts.

In some examples, the 3DP production support frames may include a handle or a vacuum plate compatible with robotic conveyance. In some examples, the 3DP production support frames may provide at least partial packaging for a finished 3DP part or to include features to provide a quality control indicator such as color accuracy or geometric accuracy.

The 3D printed structures and 3D printing processes described herein may be realized using any 3D printing technology. Examples of such 3D printing technologies include, without limitation, stereolithography (SLA), fused deposition modeling (FDM), selective laser sintering (SLS), 3D binder jetting, and multi jet fusion (MJF).

In 3D printing, a 3D structure is printed by forming successive layers of a material, such as by fusing of a powder. A 3D printer may base the forming of the layers on a computer-aided design (CAD) model or a 3D scan of an existing structure, for example. The thickness of each layer of the successive layers may vary from one printer to another. In this regard, smaller layers correspond to a higher resolution. In some examples, each layer may be formed by selectively fusing a layer of powder using energy from a laser, for example. 3D printers may be of any of a variety of sizes and resolutions, for example, to accommodate various types of applications.

In various examples, a 3D printer may implement a power-based fusing technique. In such examples, the 3D printer may include various components including, but not limited to, a recoater, a fusing device and a fusing agent delivery device. In other examples, the 3D printer may be a fused deposition modeling printer. In such cases, the printer may include an extrusion nozzle and a reservoir for holding the fusing material, for example.

Various structures may be formed by 3D printing processes by scanning various components of the 3D printer across a print bed. In various examples, a build material may be applied in layers. The build material may be particles of a material in powder form. Various components of the 3D printer may be scanned across the layer of build material to selectively fuse the build material particles in certain areas of each layer to form the desired structure.

Referring now to the figures, FIG. 1 provides a schematic illustration of an example system 100. In the example of FIG. 1, the example system 100 includes an object 101 and a support frame 102. The support frame 102 supports the object 101 in a non-rigid manner, as indicated by the dashed lines 103 in FIG. 1. The dashed lines 103 are not intended to represent a structure, but rather a schematic illustration of non-rigid support of the object 101 by the frame 103. In this regard, "non-rigid" support may refer to a structure that does not fixedly connect the object 101 to the support frame 102. Examples of support frames that provide non-rigid support are described below.

In the example system of FIG. 1, the support frame 102 constrains movement of the object 101 relative to the support frame 102. As noted above, the object is not fixedly connected to the support frame 102. In this regard, various examples may include a cage, a shackle or other movement-constraining feature formed around a part of, or the entirety of, the object 101.

Figure 2:
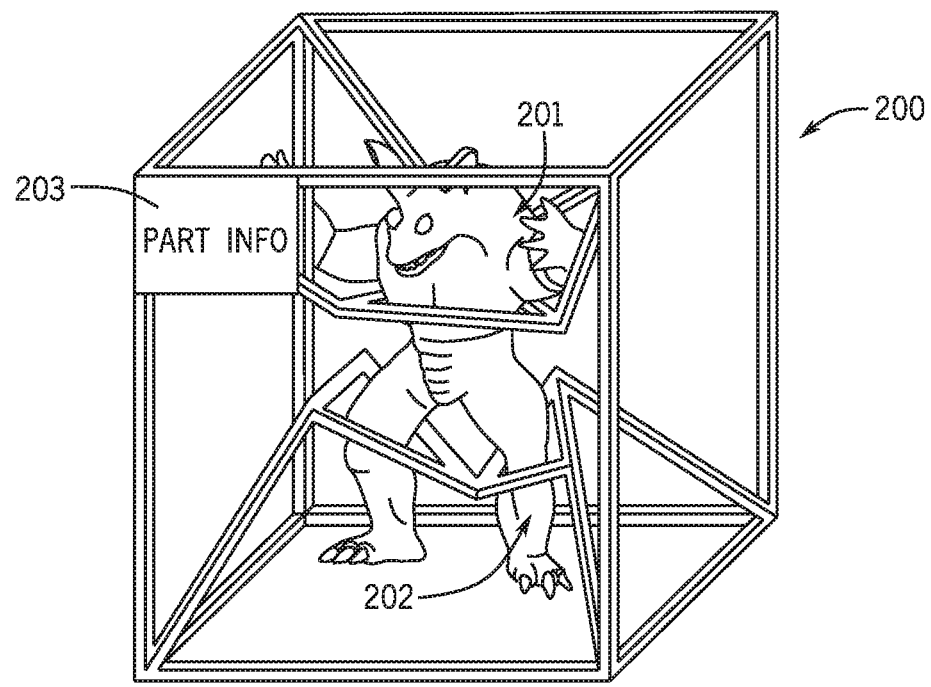
FIG. 2 illustrates an example system with an object non-rigidly supported by a support frame.

FIG. 2 illustrates an example 200 of an object 201 and a support frame 202. In various examples, the object 201 and the support frame 202 may be formed by a three-dimensional (3D) printing process. In this regard, FIG. 2 illustrates the example system 200 a 3D-printed (3DP) object 201 and a 3DP support frame 202 after removal of unfused material (e.g., a powder or viscous liquid) that may remain after completion of the 3D printing process. It will be appreciated that when the unfused material (not shown in FIG. 2) is removed, the 3DP object 201 may drop into contact with 3DP support frame 202, which will then loosely support 3DP object 201 in a desired position for subsequent processing. The spacing between the 3DP object 201 and the 3DP support frame 202 may be designed to be small enough to prevent damage to the object 201 when it drops into the frame 202. The position may be chosen by design of the frame 202 to provide unobstructed (e.g., no dead-corner) access for post-printing cleaning and finishing operations, such as surface re-melting, electroplating, painting and waxing, for example. In the example system 200 of FIG. 2, the 3DP support frame 202 fully encloses 3DP object 201 and is self-supporting to hold the 3DP part 201 in the desired position without any additional fixturing. In this regard, self-supporting refers to the ability of the support frame 202 to maintain its position without any external support. As used herein, "self-supporting" refers to the formed system or support frame. It will be understood that, during a 3D printing process, the system may use various support structures.

In various examples, the support frame 202 further includes at least one descriptor 203. The descriptor 203 may include text, graphic or other information that may be related to the object 201. For example, the descriptor 203 may include a part number that may be represented as text or a bar code.

Figure 3:
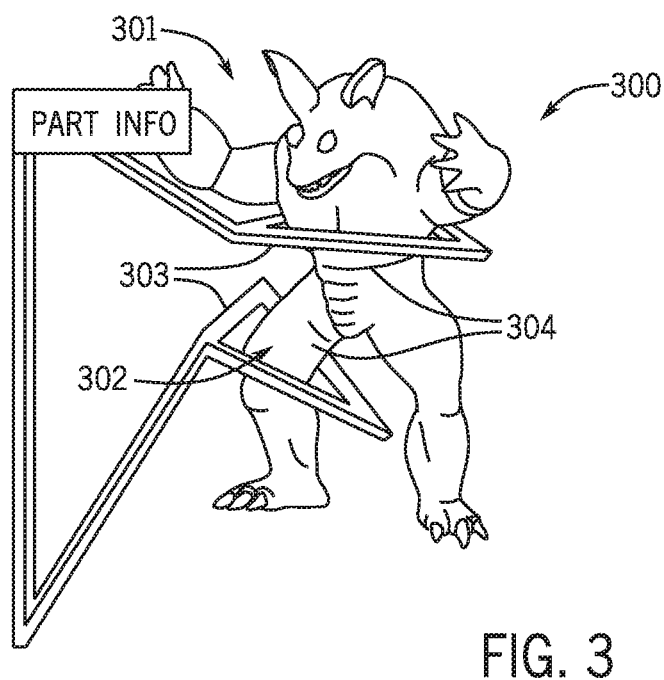
FIG. 3 illustrates another example system with an object non-rigidly supported by a support frame.

Turning now to FIG. 3, there is illustrated another example system 300 with an object 301 and a support frame 302 that partially encloses the object 301. Again, in various examples, the object 301 and the support frame 302 of the example system 300 may be formed by a 3D printing process. In the example system 300 of FIG. 3, the position of the object 301 is loosely constrained relative to the support frame 302. In this regard, the support frame 302 includes rings or shackles 303 formed around various parts 304. The rings or shackles 303 of the support frame 302 constrain movement of the parts 304 of the object 301, but the absolute position of the parts 304 relative to the support frame 302 is not fixed. In this regard, the rings or shackles 303 non-rigidly constrain movement of the parts 304 of the object 301. Further, the support frame 302 of the example system 300 of FIG. 3 is non self-supporting. In this regard, the support frame 302 does not have a structure which allows the support frame 302 to maintain its position without external support.

Figure 4:
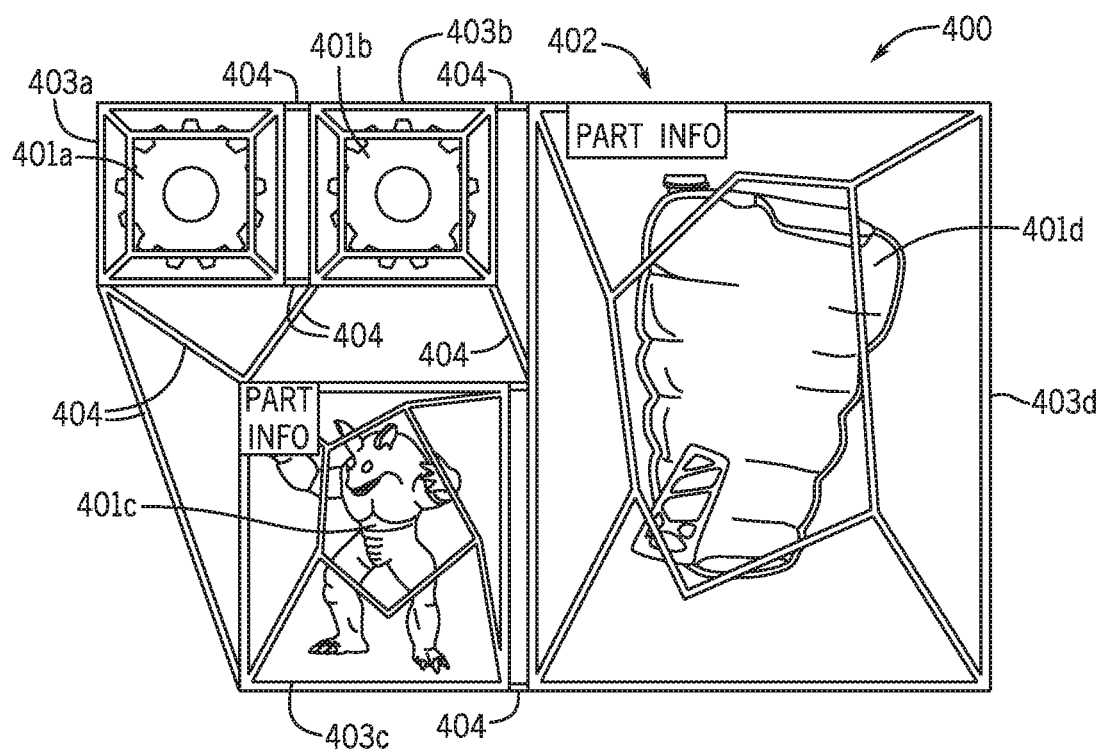
FIG. 4 illustrates another example system with a support frame having sub-frames supporting various objects.

FIG. 4 illustrates an example system 400 with at least two object 401a-d in a support frame 402. The support frame 402 of the example system 400 includes at least two sub-frames 403a-d, each of which supports at least one of the objects 401a-d. In this regard, each sub-frame 403a-d may be comparable to the frames 102, 202, 302 described above with reference to FIGS. 1-3. In the example system 400 of FIG. 4, the individual sub-frames 403a-d are connected to each other by connecting members 404 to form the frame 402. In one example, the objects 401a-d, the sub-frames 403a-d, and the connecting members 404 are formed using a 3D printing process. In one example, the objects 401a-d, the sub-frames 403a-d and the connecting members 404 are printed together and may have the same material properties (e.g., density and elasticity). In other examples, the objects 401a-d, the sub-frames 403a-d and the connecting members 404 may have different material properties. For example, the sub-frames 403a-d may be relatively flexible to provide cushioning support for the objects 401a-d (e.g., for final packaging), while the connecting members 404 may be relatively stiff to provide rigidity to the overall structure (e.g., frame 402) for ease of handling. In other examples, each object of the at least two objects 401a-d may have different material properties.

Figure 5:
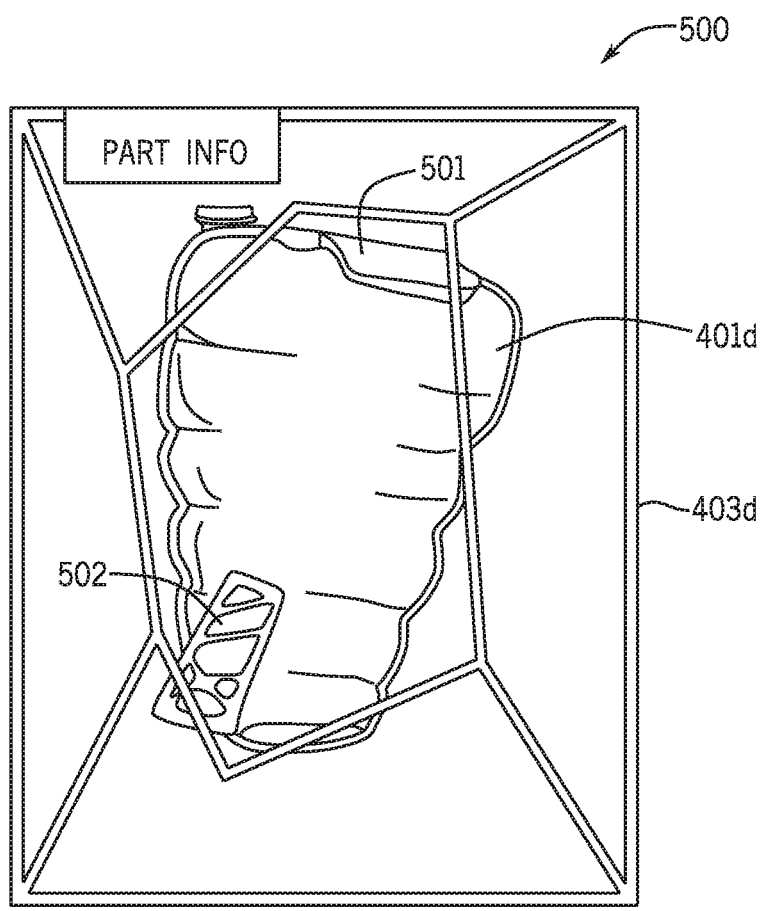
FIG. 5 illustrates an example sub-frame of the system of FIG. 4.

The example system 400 may be processed together until separated for final packaging, or, as illustrated in the example system 500 of FIG. 5. In this regard, FIG. 5 illustrates one of the sub-frames 403d of the example system 400 of FIG. 4 with the sub-frame 403d separated from the frame 402. In various examples, the various sub-frames 403a-d of the example system 400 of FIG. 4 may be separated for post-printing operations. In the example of FIG. 5, the sub-frame 403d with the object 401d from FIG. 4 has been separated for individual processing. In the example of FIG. 5, the sub-frame 403d forms a cage around the part 401d that non-rigidly constrains movement of the object 401d. The sub-frame 403d may provide unobstructed access to hard-to-clean areas of part 401d, such as hard-to-clean areas 501 and 502. In powder-based 3D printing processes, such as FDM and SLS for example, the sub-frame 403d can provide access in an optimum direction for vacuuming and sand-blasting. The sub-frame 403d may be formed a standardized geometry for mounting on standardized fixtures for post-printing finishing operations and conveyance, for example. During finishing, for example, the sub-frame 403d can enable an operator or a machine to orient the object 401d supported in the sub-frame 403d without actually touching the object 401d.

For other 3DP processes, such as SLA and FDM for example, the sub-frame 403d can provide a standardized geometry for attachment to fixtures that are used for soaking and/or rinsing parts to remove material residue after printing.

Figure 6:
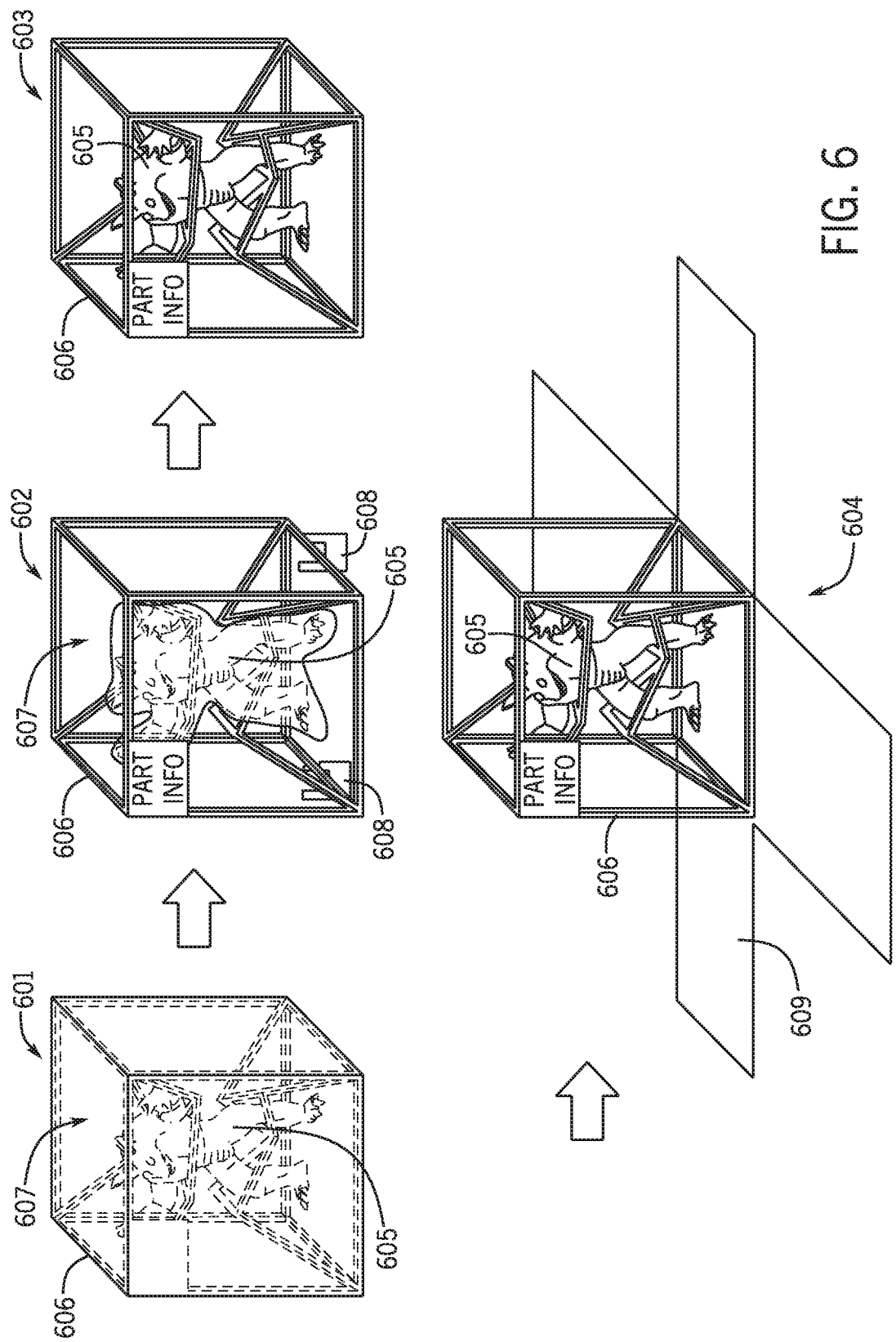
FIG. 6 illustrates various example phases of post-processing operations.

FIG. 6 illustrates various example phases of post-processing operations. For example, the various phases may include an example sequence of post-printing processing and packaging operations for a powder-based printing process. At phase 601 in FIG. 6, there is illustrated a 3DP object 605 and a 3DP support frame 606 immediately after printing. In this phase, unfused powder 607 remains from the printing process in and around the object 605 and the support frame 606. Phase 602 illustrates the condition of the 3DP object 605, the 3DP support frame 606, and the unfused powder 607 after vacuuming and sand-blasting. In various examples, the vacuuming and sand-blasting may be performed in an automated manner by placing the support frame 606 on supports 608. The vacuuming and sand-blasting may remove much of the unfused powder 607, but some may remain, as illustrated in the phase 602 of FIG. 6. Phase 603 illustrates the condition of the 3DP object 605 and the 3DP support frame after manual cleaning and finishing. In this phase 603, any remaining unfused powder may be removed. Finally, phase 604 illustrates the 3DP object 605 supported within the 3DP support frame 606 and ready for final packaging 609. It will be appreciated that the 3DP support frame 606 may support and protect the 3DP object 605 while providing a convenient form factor for applying the final packaging 609.

Figure 7:
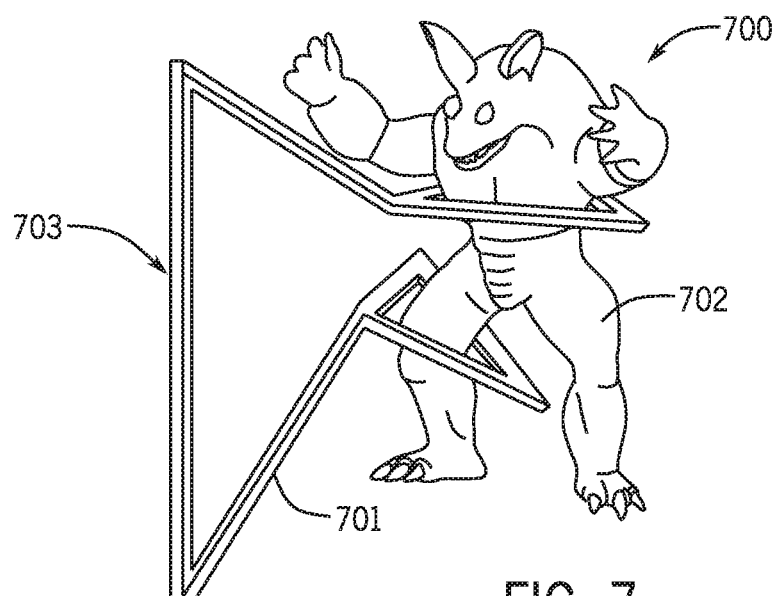
FIG. 7 illustrates an example support frame incorporating a handle for post-processing operations.
Figure 8:
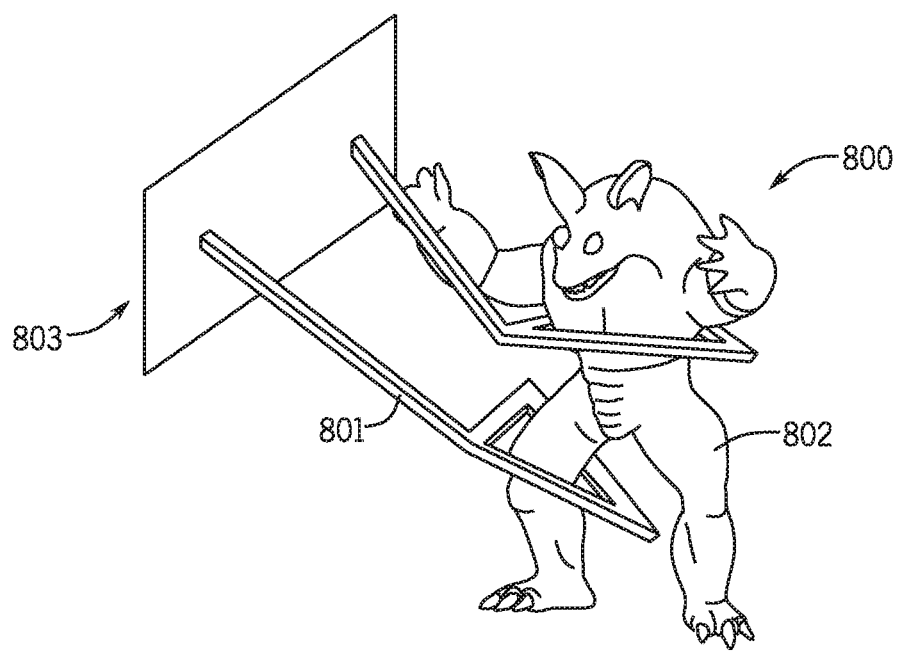
FIG. 8 illustrates an example support frame incorporating a vacuum plate for post-processing operations.

As noted above, in some examples of support frames, the frames may include features that facilitate automatic handling and conveyance, various examples of which are illustrated in FIGS. 7 and 8. Referring now to FIG. 7, there is illustrated an example system 700 of a support frame 701 partially enclosing an object 702. As illustrated in FIG. 7, the support frame 701 may include a segment 703 suitable to be gripped by a robotic arm (not shown). For example, the segment 703 may be thicker, denser or more rigid than the rest of the support frame 701 in order to withstand the force or stress applied by a robotic arm.

FIG. 8 illustrates an example system 800 of a support frame 801 partially enclosing an object 802. As illustrated in FIG. 8, the support frame 801 may include a vacuum plate 803 suitable to be picked up by a robotic vacuum pickup (not shown). For example, the vacuum plate 803 may be thicker, denser or more rigid than the rest of the 3DP production support frame 701 in order to withstand the force or stress applied by a vacuum pickup.

It will be appreciated that the examples provided in FIG. 7 and FIG. 8 are not limited to support frames that only partially enclose their respective objects. In some examples, handling features such as segment 703 and vacuum plate 803 may be incorporated into fully enclosing frames, such as frame 202 illustrated in FIG. 2, for example.

Figure 9:
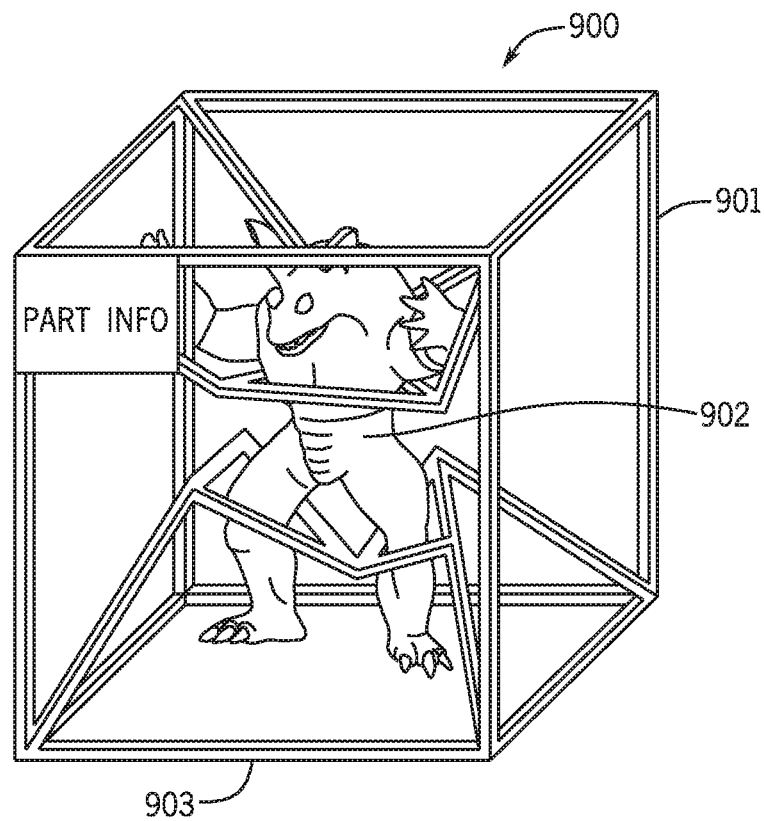
FIG. 9 illustrates an example system with a support frame including a quality control indicator.

In various examples, the features of a support frame according to the present disclosure may provide quality control indicators. In some examples, such as the example system 900 illustrated in FIG. 9, a support frame 901 supporting an object 902 may include a frame portion 903 to indicate at least one quality control parameter. In one example, the frame portion 903 may be used as an indicator of color accuracy (e.g., by comparison with a reference color). In another example, the frame portion 903 may be used as an indicator of geometric accuracy to determine if there is any warpage during manufacture of the system 900. For example, the frame portion 903 may be compared to a reference shape or length. In various examples, the frame portion 903 or the entire frame 901 may be formed of the same material and color as the object 902. In this regard, the frame portion 903 or other parts of the frame 901 may be used by a user for testing purposes. For example, a user wishing to paint the object 902 may wish to test the color or adherence of the paint by first applying it to the frame portion 902 or other parts of the frame 901.

Figure 10:
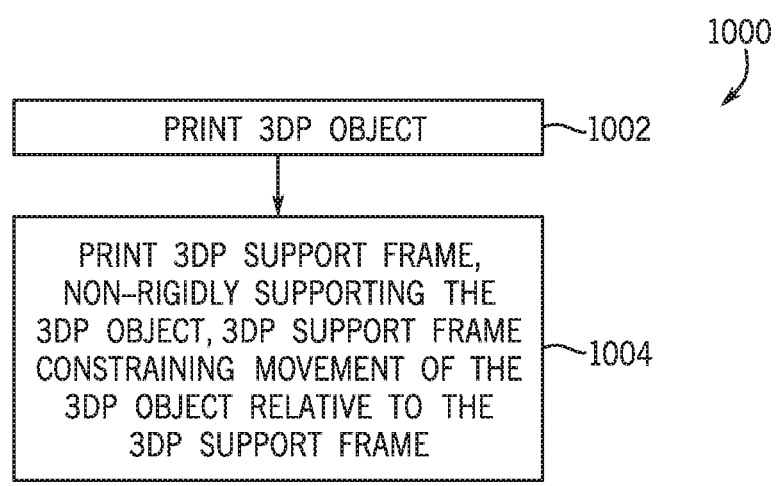
FIG. 10 is a flowchart illustrating an example process.

FIG. 10 is a flowchart illustrating an example process 1000 for manufacturing an example system which includes a 3DP object with a 3DP support frame, such as the objects and frames of the systems 100, 200, 300 described above with reference to FIGS. 1-3, for example. The example process 1000 begins with operation 1002, printing at least one 3DP object (e.g., object 101, 201, 301). The example process 1000 continues at operation 1004, printing a 3DP support frame (e.g., frame 102, 202, 302), corresponding to the 3DP object printed at operation 1002. The support frame supports the 3DP object in a non-rigid manner. Further, the 3DP support frame constrains movement of the 3DP object relative to the 3DP support frame.

With respect to example process 1000, it will be appreciated that due to the nature of 3D printing, the process 1000 may be performed as an iterative process with many passes corresponding to individual layers as they are printed. In this regard, both operations 1002 and 1004 may be performed simultaneously under a common 3D printing process. It will also be appreciated that not every component of the corresponding 3D printed structure will be present in every layer so that some operations may be omitted in some layers. It will also be appreciated that the order of operations in the processes may be altered in the printing of any given layer.

Thus, in accordance with various examples described herein, support frames for loosely supporting objects in a non-rigid manner may be produced to facilitate automated unpacking, cleaning and conveyance operations, to provide components of final product packaging, and to provide quality control indicators.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
 an object; and
 a support frame supporting the object,
  wherein the support frame constrains movement of the object relative to the support frame,
  wherein the support frame includes a cage to non-rigidly constrain movement of at least a part of the object,
  wherein the support frame fully encloses the object and includes a solid cushioning portion and a rigid support portion,
  wherein the solid cushioning portion comprises a sub-frame, and
  wherein the object and the support frame are printed from a common material in a three-dimensional (3D) printing process.

2. The system of claim 1, wherein the object is a three-dimensional (3D)-printed object and the support frame is a 3D-printed support frame.

3. The system of claim 1, wherein the support frame is self-supporting.

4. The system of claim 1, wherein the support frame includes at least partial packaging for the object.

5. The system of claim 1, wherein the support frame constrains an attitude of the object relative to an attitude of the support frame.

6. A method, comprising:
 printing a three-dimensional (3D) printed object; and
 printing a 3D-printed support frame non-rigidly supporting the object, the 3D-printed support frame constraining movement of the 3D-printed object relative to the 3D-printed support frame,
  wherein the 3D-printed support frame includes a cage to non-rigidly constrain movement of at least a part of the 3D-printed object,
  wherein the 3D-printed support frame fully encloses the 3D-printed object and includes a solid cushioning portion and a rigid support portion, wherein the solid cushioining portion comprises a sub-frame, and
  wherein the 3D-printed object and the 3D-printed support frame are printed from a common material in a 3D-printing process.

7. The method of claim 6, further comprising at least one of unpacking, cleaning or finishing the 3D-printed object.

8. The method of claim 6, wherein the 3D-printed support frame is self-supporting.

9. The method of claim 6, wherein the 3D-printed support frame supports and cushions the 3D-printed object.

10. The method of claim 6, wherein the 3D-printed support frame includes at least partial packaging for the 3D-printed object.

11. A system, comprising:
- at least two three-dimensional (3D)-printed objects;
- a 3D-printed frame, comprising:
- at least two sub-frames, each sub-frame non-rigidly supporting a corresponding object of the at least two 3D-printed objects; and
- connecting members, each connecting member connecting one of the at least two sub-frames to another of the at least two sub-frames,
- wherein each sub-frame constrains movement of the corresponding object relative to the sub-frame,
- wherein the 3D-printed frame constrains movement of the at least two three-dimensional 3D-printed objects relative to the 3D-printed frame,
- wherein the 3D-printed frame includes a cage to non-rigidly constrain movement of at least a part of the at least two three-dimensional 3D-printed objects,
- wherein the 3D-printed frame fully encloses the at least two three-dimensional 3D-printed objects and includes a solid cushioning portion and a rigid support portion,
- wherein the solid cushioning portion comprises the at least two sub-frames, and
- wherein the at least two three-dimensional 3D-printed objects and the 3D-printed frame are printed from a common material in a three-dimensional (3D) printing process.

12. The system of claim 1, wherein the connecting members have different material properties than the sub-frames.

13. The system of claim 2, wherein the object and the support frame comprise successively-fused layers of the same material, and
wherein the object and the support frame are the same color.

14. The system of claim 13, wherein the successively-fused layers of the support frame define a part descriptor that describes the object supported by the support frame.

15. The system of claim 1, wherein:
the support frame is separably connected to at least one additional support frame by at least one connecting member, and
the additional support frame supports an additional object, fully encloses the additional object, and constrains movement of the additional object relative to the additional support frame.

16. The system of claim 15, wherein the at least one connecting member comprises successively-fused layers of the same material or a different material, and wherein the at least one connecting member is more rigid than the support frame and the additional support frame.

17. The system of claim 16, wherein the at least one connecting member is separable from the support frame or the additional support frame.

\* \* \* \* \*